United States Patent [19]
Perkowski

[11] Patent Number: 5,918,214
[45] Date of Patent: Jun. 29, 1999

[54] SYSTEM AND METHOD FOR FINDING PRODUCT AND SERVICE RELATED INFORMATION ON THE INTERNET

[75] Inventor: Thomas J. Perkowski, Darien, Conn.

[73] Assignee: IPF, Inc., Darien, Conn.

[21] Appl. No.: 08/736,798

[22] Filed: Oct. 25, 1996

[51] Int. Cl.[6] .............................. G06F 17/60; G06F 17/00
[52] U.S. Cl. .............................. 705/27; 705/26; 235/375; 395/200.49; 379/93.12
[58] Field of Search .................................. 705/1, 16, 17, 705/21, 26, 27; 235/375, 376, 385, 454, 462; 395/200.31, 200.33, 200.47, 200.49; 379/93.12

[56] References Cited

U.S. PATENT DOCUMENTS

| | | | |
|---|---|---|---|
| 4,654,482 | 3/1987 | DeAngelis | 379/93.12 |
| 5,640,193 | 6/1997 | Wellner | 348/7 |

*Primary Examiner*—Stephen R. Tkacs
*Attorney, Agent, or Firm*—Thomas J. Perkowski

[57] ABSTRACT

A novel system and method for finding product and service related information on the Internet. The system includes Internet Servers which store information pertaining to Universal Product or Service Number (e.g. UPC number) pre-assigned to each product and service registered in the system, with Uniform Resource Locators (URLs) that point to the location of one or more information resources on the Internet, e.g. World Wide Websites, related to such products or services. Each client computer system includes an Internet browser or Internet application tool which is provided with a "Internet Product/Service Information (IPSI) Finder" button and a "Universal Product/Service Number (UPSN) Search" button. The system enters its "IPSI Finder Mode" when the "IPSI Finder" button is depressed and enters the "UPSN Search Mode" when the "UPSN Search" button is depressed. When the system is in its IPSI Finder Mode, a predesignated information resource (e.g. advertisement, product information, etc.) pertaining to any commercial product or service registered with the system is automatically accessed from the Internet and displayed from the Internet browser by simply entering the registered product's UPN or the registered service's USN into the Internet browser. When the system is in its "UPSN Search Mode", a predesignated information resource pertaining to any commercial product or service registered with the system is automatically accessed from the Internet and displayed from the Internet browser by simply entering the registered product's trademark(s) or (servicemark) and/or associated company name into the Internet browser.

13 Claims, 11 Drawing Sheets

| IP/SN | REGISTRANT'S NAME | PRODUCT DESCRIPTION | UNIFORM RESOURCE LOCATOR (URL) | TRADE/SERVICE MARKS | E-MAIL ADDRESS | STATUS |
|---|---|---|---|---|---|---|
| 7/18908/17674/0 | APPLE COMPUTER, INC. CUPERTINO, CALF. | POWER MAC. 7600/120 PERSONAL COMPUTER | http://www.----/ | POWER MAC. | | |
| | | | | | | |
| 0/373/100/6 | PROCTOR & GAMBLE | TOOTH PASTE | http://www.----/ | CREST | | |
| 3/12547/68404/0 | WARNER WELCOME | ACID REDUCER | http://www.----/ | ZANTAC, ZANTAC 75 | | |
| | | | | | | |
| 0/00005/17643/4 | KODAK, INC. | FILM PROCESSING | http://www.----/ | KODAK | | |
| | | | | | | |
| ... | ... | ... | ... | ... | ... | ... |
| 0/27242/51057/9 | SONY, INC. | PERSONAL COMPUTER | http://www.sony.com./pc | SONY | | |

FIG. 2A

| IP/SN | REGISTRANT'S NAME | PRODUCT DESCRIPTION | TRADE/SERVICE MARKS | E-MAIL ADDRESS | STATUS |
|---|---|---|---|---|---|
| 7/05089/37460/7 | NETSCAPE COMMUNICATIONS CORP. | INTERNET NAVIGATOR | NETSCAPE, NAVIGATOR | | |
| 0/30000/01020/4 | QUAKER, INC. | OATMEAL | QUAKER | | |
| 0/496/390/1 | COLA COLA, INC. | COLA SODA | COCA - COLA, COKE | | |
| 0/7599/24245/2 | WARNER BROS. | PAT METHANY AUDIO CD | GEFFEN | | |
| ... | ... | ... | ... | ... | ... |

FIG. 2B

"IP/SNN SEARCH MODE ( FIG. 5B )"

SYSTEM AND METHOD FOR FINDING PRODUCT AND SERVICE RELATED INFORMATION ON THE INTERNET

BACKGROUND OF INVENTION

1. Field of Invention

The present invention relates to a system and method for finding product and service related information on the National Information Infrastructure (e.g. the Internet).

2. Brief Description of the Prior Art

Presently, an enormous amount of time, money and effort is being expended by companies in order to advertise and sell their products and services, and after product purchase has taken place, to provide product related information, product warranty service and the like. For decades, various types of media have been used to realize such fundamental business functions.

In recent times, there has been a number of significant developments in connection with the global information network called the "Internet", which has greatly influenced many companies to create multi-media Internet Websites in order to advertise, sell and maintain their products and services. Examples of such developments include, for example: the Hypertext Markup Language (HTML) by Tim Berners-Lee; easy to use GUI-based Internet navigation tools, such as the Netscape® browser from Netscape Communications, Inc., the Internet Explorer™ browser from MicroSoft Corporation and the Mosaic™ browser from Spyglass Corporation; and the Virtual Reality Modelling Language (VRML) by Mark Pecse. Such developments in recent times have made it very easy for businesses to create 2-D Hypermedia-based Home Pages and 3-D VR Worlds (i.e. 3-D Websites) for the purpose of projecting a desired "corporate image" and providing a backdrop for financial investment solicitation as well as product and service advertisement, sales and maintenance operations.

Presently, a person desiring to acquire information about any particular product sold anywhere in the world, has had a number of search options available to them. In particular, he or she may attempt to directly contact the manufacturer, wholesaler or reseller by telephone, US mail, e-mail, or through the company's World Wide Website (WWW), if they have one. In the event one decides to acquire product information through the seller's WWW site, he or she must first determine the location of its WWW site (i.e. Internet address) which oftentimes can involve using Internet Search engines such as Yahoo, AltaVista, WebCrawler, or the like. This can be a very time consuming process and sometimes lead to a dead end. Once the Internet address is obtained, one must then review the home page of the company in order to find where information on a particular product resides on the Internet. This search process can be both time consuming and expensive (in terms of Internet time) and may not turn up information on the product or service of interest.

In some instances, product brochures bear a preprinted Internet address designed to direct or point prospective customers to a particular Web site where more detailed product information can be found. A recent example of this "preprinted Web Address" pointing technique is the 1996 product brochure published by the Sony Corporation for its Sony® PCV-70 Personal Computer, which refers prospective customers to the Sony Web Address "http://www.sony.com/pc". While this approach provides a direct way of finding product and service related information on the Internet, it is not without its shortcomings and drawbacks.

In particular, when a company improves, changes or modifies an existing Website which publishes product and/or service advertisements and related information, it is difficult (if not impossible) not to change the Internet locations (i.e. Web addresses) at which such product and/or service advertisements and related information appear. Whenever a company decides or is forced to change any of its advertising, marketing and/or public relations firms, there is a substantial likelihood that new Websites will be created and launched for particular products and services, and that the Web addresses of such new Websites will no longer correspond with the Web addresses on preprinted product and service brochures currently in circulation at the time. This can result in pointing a consumer to erroneous or vacant Web sites, that present either old or otherwise outdated product and/or service information, possibly adversely influencing the consumer's purchasing decision.

Moreover, when a company launches a new Website as part of a new advertising and marketing campaign for a particular product or service, any preprinted advertising or marketing material relating to such products and services will not reflect the new Website addresses which the campaign is attempting to get consumers to visit. This fact about preprinted advertising media renders it difficult to unify new and old advertising media currently in circulation into an advertising and marketing campaign having a coherent theme.

In short, the inherently static nature of the "preprinted Web address" pointing technique described above is wholly incapable of adjusting to the dynamic needs of advertising, marketing and public relations alike.

Thus, it is clear that there is great need in the art for an improved system and method for finding commercial product and service information on the Internet, in a way which avoids the shortcomings and drawbacks of prior art systems and methodologies.

OBJECTS AND SUMMARY OF INVENTION

Accordingly, a primary object of the present invention is to provide a novel system and method for finding product and service related information on the Internet, while avoiding the shortcomings and drawbacks of prior art systems and methodologies.

Another object of the present invention is to provide such a system and method, wherein virtually any type of product or service can be registered with the system by symbolically linking its preassigned Universal Product or Service Number (e.g. UPC numeric string) that points to the Uniform Resource Locators (URLs) of one or more information resources on the Internet, e.g. World Wide Websites, related to such products or services.

Another object of the present invention is to provide such a system and method with an improved Internet browser or Internet application tool having both an "Internet Product/Service Information (IPSI) Finder" button for entering the "IPSI Finder Mode of the system when it is depressed, and also a "Universal Product/Service Number (UPSN) Search" button for entering the "UPSN Search Mode" when the "UPSN Search" button is depressed.

Another object of the present invention is to provide such a system, wherein, when the system is in its product/service finder mode, a predesignated information resource (e.g. advertisement, product information, etc.) pertaining to any commercial product or service registered with the system can be automatically accessed from the Internet and displayed from the Internet browser by simply entering the registered product's UPN or the registered service's USN into the Internet browser.

Another object of the present invention is to provide such a system, wherein, when the system is in its "UPSN Search Mode", a predesignated information resource (e.g. advertisement, produce information, etc.) pertaining to any commercial product or service registered with the system can be automatically accessed from the Internet and displayed from the Internet browser by simply entering the registered product's trademark(s) or associated company name into the Internet browser.

Another object of the present invention is to provide such a system, wherein a predesignated information resource pertaining to any commercial product or service having been assigned a Universal Product Number (UPN) or Universal Service Number (USN) can be accessed from the Internet and displayed from the Internet browser by simply pressing its IPSI Finder button and then entering the UPN or USN numeric string into a dialogue box which pops up on Internet Browser.

Another object of the present invention is to provide such a system in which a relational database, referred to as "an Internet Product and Service Directory (IPSD)" is realized on one or more data-synchronized IPSD Servers for the purpose of registering product and service related information, namely: (i) information representative of commercial product descriptions, the trademarks used in connection therewith, the company names providing and/or promoting such products, the E-mail addresses of such companies, and the corresponding URLs on the Internet specifying current (i.e. up-to-date) Internet web site locations that provide product-related information customized to such products; and (ii) information representative of commercial service descriptions, the service marks used in connection therewith, the company names providing and/or promoting such services, the E-mail addresses of such companies, and the corresponding URLs on the Internet specifying current (i.e. up-to-date) Internet web site locations that provide service-related information customized to such services.

Another object of the present invention is to provide a novel method of carrying out electronic-type commercial transactions involving the purchase of products and services which are advertised on the Internet at uniform resource locations that are registered with the IPSI system of the present invention.

Another object of the present invention is to provide a novel system and method of finding in the UPN or USN associated with any particular registered product or service by simply pressing a GUI button on the Internet browser in order to enter a "UPSN Search Mode", whereby (i) a dialogue box is displayed on the display screen requesting any known trademarks associated with the product, or the name of the company that makes, sells or distributes the particular product, and (ii) the corresponding UPN (i.e. UPC) number registered with the IPSD Servers is displayed to the user for acceptance, whereupon the Internet information resource is automatically accessed and displayed on the display screen of the Internet browser.

Another object of the present invention is to provide such a system and method, wherein during the UPSN Search Mode, the UPN (e.g. UPC data structure or numeric string) associated with any registered product can be found within the database of the IPSD Server using any trademark(s) and/or the company name commonly associated with the product, and the USN number associated with any registered service can be found within the database of the IPSD Server using any servicemark(s) and/or the company name commonly associated with the service.

Another object of the present invention is to provide such a system and method, in which Website-based advertising campaigns can be changed, modified or transformed in virtually any way imaginable by simply restructuring the symbolic links between the products and/or services in the campaign with the current Website addresses at which Website advertisements and information sources related thereto are located on the Internet.

Another object of the present invention is to provide a novel system and method of automatically soliciting companies to register their products and services within the databases of such IPSD Servers in order that product and service related information of a multimedia nature (e.g. Websites) registered therewith can be easily found on the Internet by anyone using the system and method of the present invention.

These and other objects of the present invention will become apparent hereinafter and in the Claims to Invention

BRIEF DESCRIPTION OF THE DRAWINGS

For a more complete understanding of how to practice the Objects of the Present Invention, the following Detailed Description of the Illustrative Embodiments should be read in conjunction with the accompanying Drawings, wherein:

FIG. 2A is a schematic representation of the relational-type IPSI Registrant Database maintained by each IPSD Server that is configured into the IPSI finding system of the illustrative embodiment of the present invention, showing the information fields for storing (i) the information elements representative of the UPN (e.g. UPC numeric data structure, National Drug Code (NDC) numeric data structure, and/or European Product Code (EPC) alpha-numeric data structure), URL, trademark(s) ($TM_i$), Company Name ($CN_i$), Product Description ($PD_i$) and E-mail Address ($EMA_i$) thereof symbolically-linked (i.e. related) for a number of exemplary IPSI Registrants listed (i.e. registered) with the IPSI Registrant Database maintained by each IPSD Server, and (ii) the information elements representative of the UPN (e.g. UPC numeric data structure, National Drug Code (NDC) numeric data structure, and/or European Product Code (EPC) alphanumeric data structure), URL, Servicemark(s) ($SM_i$), Company Name ($CN_i$), Service Description ($SD_i$) and E-mail Address ($EMA_i$) thereof symbolically-linked for a number of exemplary IPSI Registrants registered with the IPSI Registrant Database maintained by each IPSD Server;

FIG. 2B is a schematic representation of the relational-type Non-IPSI Registrant Database maintained by each IPSD Server that is configured into the IPSI finding system of the illustrative embodiment of the present invention, showing the information fields for storing (i) the information elements representative of the Company Name ($CN_i$), Trademark(s) ($TM_i$) registered by the associated Company, and E-Mail Address ($EMA_i$) thereof symbolically-linked for a number of exemplary Non-IPSI registrants listed within the Non-IPSI Registrant Database maintained by each IPSD Server, and (ii) the information elements representative of the Company Name ($CN_i$), Servicemark(s) ($SM_i$) registered by the associated Company, and E-Mail Address ($EMA_i$) thereof symbolically-linked for a number of exemplary Non-IPSI registrants listed within the Non-IPSI Registrant Database maintained by each ISPD Server;

DETAILED DESCRIPTION OF THE ILLUSTRATIVE EMBODIMENTS

Figure 1:
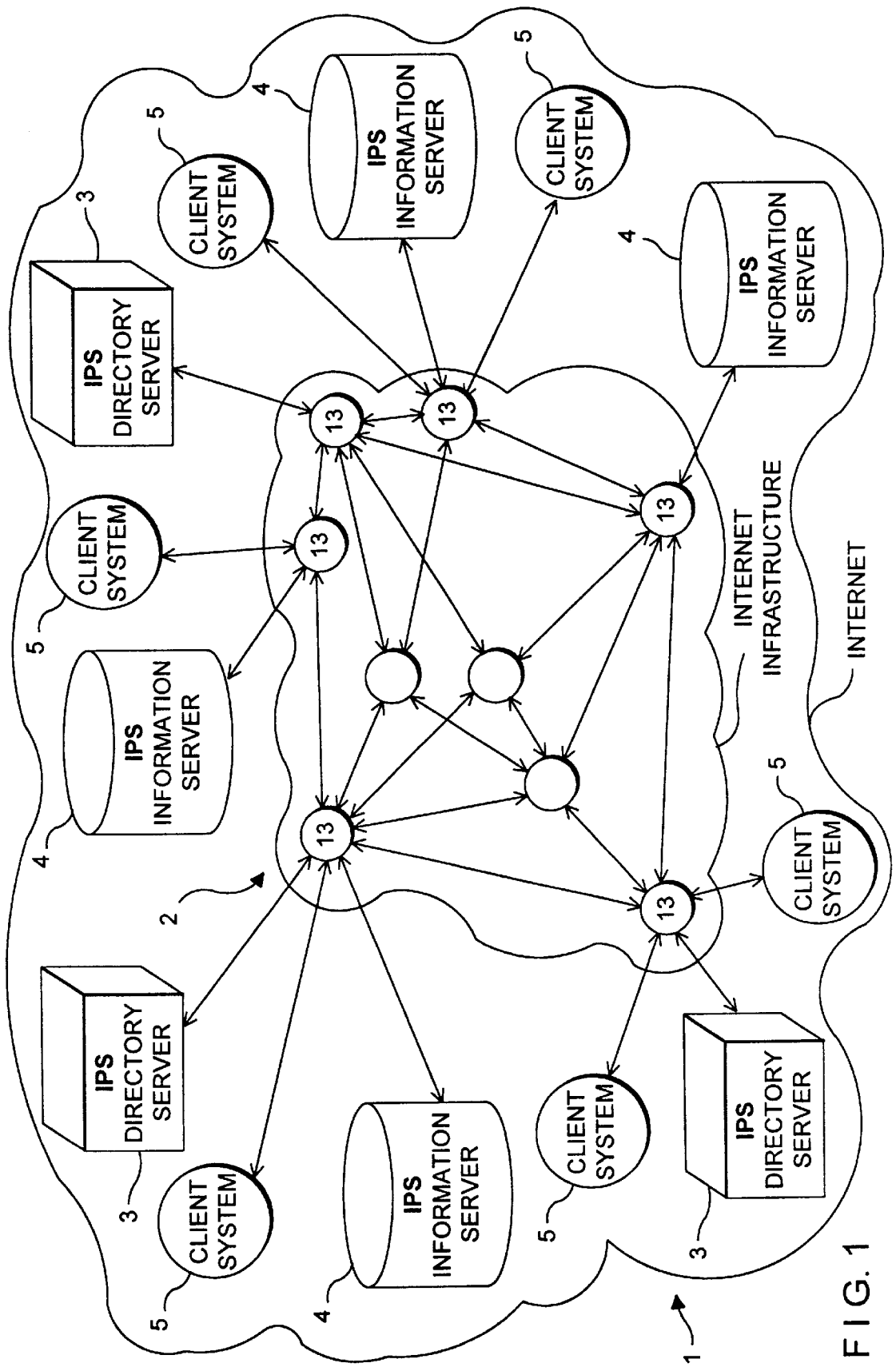
FIG. 1 is a schematic diagram of a first illustrative embodiment of the product and service information finding system of the present invention shown embedded with the infrastructure of the global computer communications network known as the "Internet", and comprising a plurality of data-synchronized Internet Product and Service Directory (IPSD) Servers connected to the infrastructure of the Internet, a plurality of Internet Product and Service Information (IPSI) Servers connected to the infrastructure of the Internet, and a plurality of Client Systems connected to the infrastructure of the Internet.

Referring to the figures shown in the Drawings, like structures and elements shown throughout the figures shall be indicated with like reference numerals.

The Structure of the Internet Product and Service Information (IPSI) Finding System of the Present Invention As shown in FIG. 1, the product/service information delivery system of illustrative embodiment of the present invention indicated by reference numeral 1, comprises an arrangement of system components, namely: a globally-based digital telecommunications network (such as the Internet) 2 having an infrastructure (including Internet Service Providers (ISPs), Network Service Providers (NSPs), routers, telecommunication lines, channels, etc.) for supporting packet-switched type digital data telecommunications using the TCP/IP networking protocol well known in the art; one or more Internet Product and Service Directory (IPSD) Servers, each indicated by reference numeral 3 and being connected to the Internet at strategically different locations via the Internet infrastructure and data-synchronized with each other in order that each such Server maintains a mirrored database structure as represented in FIGS. 2A and 2B; a plurality of Internet Product and Service Information (IPSI) Servers, each indicated by reference numeral 4 and being connected to the Internet via the Internet infrastructure; and a plurality of User (or Client) Computers, each indicated by reference numeral 5 and being connected to the Internet via the Internet infrastructure.

In a first illustrative embodiment of the system shown in FIG. 1, each Client Computer 5 has an GUI-based Internet browser program (e.g. Netscape, Internet Explorer, Mosaic, etc.) which has been provided with a suitable plug-in type module constructed in such a way as to provide the functionalities of the present invention herein disclosed. An exemplary display screen produced by the GUI-based web browser program is set forth in FIG. 1A. As shown, the GUI-based web browser program provides an on-screen IPSI Finder Button 8 and an on-screen US/PN Search Button 9 for carrying out the IPSI finding method of the present invention. The details of these functions will be described in detail hereinafter.

In an alternative embodiment of the system shown in FIG. 1, each Client Computer has a conventional GUI-based web browser program (e.g. Netscape, Internet Explorer, Mosaic, etc.) with a plug-in type module, such as CyberFinder™ navigational software by Aladdin Systems, Inc., of Watsonville, Calif., that provides an on-screen graphical icon for an "IPSI Website Finder" function. An exemplary display screen 10 produced by such a GUI-based web browser program is set forth in FIG. 1B. As shown, the on-screen IPSI Website Finder icon functions as an "IPSI Website Finder" Button 11 for instantly connecting the Client System to the IPSI Website (i.e. on each IPSD Server) and carrying out the Internet Product and Service Information (IPSI) finding method of the present invention. Upon pressing this button, the user is automatically connected to IPSI Website (supported on each IPSD Server), at whose "home page" the IPSI Finder and UP/SN Search buttons described above appear and functionalities represented thereby are provided. The URL for the home page of the IPSI Website could be selected to be, for example, "http://home.ipsi.com", similar in form to other commercial search engines currently available on the Internet. Alternatively, the URL of the IPSI Website can be recorded as a browser "bookmark" for easy recall and access through a conventional GUI-based Internet browser. Once at the home page of the IPSI Website, an Internet user can find product and service related information on the Internet in essentially the same way as when using the web browser program of FIG. 1A.

In the illustrative embodiment, each synchronized IPSD Server 3 can be realized by, for example, the PowerMac® Internet Server from Apple Computer, Inc. or any other suitable computing machine that can perform the function of a Server in a web-based, client-server type computer system architecture of the illustrative embodiment. As shown in FIG. 1, each IPSD Server is interfaced with an ISP 13 in a conventional manner. Each such IPSD Server is assigned a unique domain name and TCP/IP address on the Internet. Each IPSD Server is also provided with (i) Internet networking software to support the TCP/IP networking protocol, (ii) an Application Programming Interface (API) for website and application program development and (iii) website server software for creating and maintaining the IPSI Registrant Database and the Non-IPSI Registrant Database schematically illustrated in FIGS. 2A and 2B, respectively. Such databases can be expressed in the Sybase language, the 4th Dimension® SQL Language, or any other suitable database language which allows for database programming and database connectivity over the Internet. A suitable development program for creating a dynamic website with the integrated database structures of FIGS. 2A and 2B is the "4D Web SmartServer" from ACI, Inc. Data synchronization thereof can be achieved using conventional data synchronization techniques well known in the art. In addition, a backup and mirroring program should be used for complete data security. Preferably, the synchronized IPSD Servers are maintained by a team of network managers under the supervision of one or more webmasters.

Similarly, each IPSI Server 4 can be realized by, for example, the PowerMac® Internet Server from Apple Computer, Inc., or any other computing machine that can perform the function of a Server in a web-based, client-server type computer system architecture of the illustrative embodiment. As shown in FIG. 1, each IPSI Server is interfaced with an ISP 13 in a conventional manner. Each such IPSI Server is assigned a unique domain name and TCP/IP address on the Internet. Each IPSI Server is also provided with (i) Internet networking software to support the TCP/IP networking protocol, (ii) an Application Programming Interface (API) for application program development and (iii) website server software for creating and maintaining a hypermedia-type website containing product and/or service related information of a multi-media nature. Such websites can be expressed in HTML and/or VRML or any other suitable language which allows for website construction and website connectivity. Website management software, such as Adobe® SiteMill™, should be used to maintain correct links for any particular web site. Preferably, the IPSI Servers are maintained by a team of network managers under supervision of one or more webmasters.

Each User (i.e. Client) Computer 5 can be realized by any computing system employing operating system (OS) software (e.g. Macintosh, Windows, Unix etc.) which supports an Internet browser program (e.g. Netscape, Internet Explorer, Mosaic, etc.) which includes Internet networking software that supports the TCP/IP networking protocol, and provides a GUI-based Web browser interface. Alternatively, Client Systems may also be realized by (i) a Newton MessagePad 130 (running the Newton 2.0 Operating System and NetHopper™ Internet Software), (ii) a Pippin™ computer system from Apple Computer, Inc., (iii) a network computer (NC) that supports the Java™ programming language and Java applets expressed therewith, (iv) a Sony® WebTV Internet Terminal (supported by the WebTV Service provided by WebTV Network, Inc.), or the like. As shown in FIG. 1, each Client Computer is interfaced with an ISP 13 in a conventional manner. Each such Client System may be assigned a unique domain name and TCP/IP address the Internet, or one may be dynamically assigned thereto by way of its ISP depending on its connectivity. Optionally, each Client System may include website server software for creating and maintaining the hypermedia-type website in a manner well known in the art.

Typically, each Client System 5 will be maintained by potential consumers of products and services which can be found on the Internet. It is understood, however, that Client Systems can be realized in the form of a computer-based kiosk located in supermarkets, department stores, retail outlets, or other public location where products and/or services are being offered for sale. In one embodiment of the computer-based kiosk, a visual display screen, keyboard and pointing device would be provided in the conventional manner to enable consumers to operate its GUI-based browser and thus carry out the method of the present invention. In an alternative embodiment of the kiosk-based Client System, an integrated bar code reader is provided for reading UPC symbols printed on products (as well as UPNs printed on service-related brochures), and a visual display screen is provided for viewing product and service related information automatically displayed thereon in response to the entry of the UPSN information scanned into the system.

The Database Structure of the IPSD Server

As mentioned above, each synchronized IPSD Server 4 maintains two different relational databases, namely: a IPSI Registrant Database; and a Non-IPSI Registrant Database. A schematic representation of the IPSI Registrant Database is shown in FIG. 2A, whereas a schematic representation of the Non-IPSI Registrant Database is shown in FIG. 2B.

As shown in FIG. 2A, the relational-type IPSI Registrant Database maintained by each IPSD Server comprises a plurality of labelled information fields for each product or service "registered" therewith, namely: an IP/SN Information Field for storing information (e.g. numeric or alphanumeric string) representative of the Universal Product or Service Number (e.g. UPC numeric string) assigned to the product or service; a Company Name Information Field for storing information (e.g. numeric or alphanumeric string) representative of the name of the company making, selling or distributing the corresponding product or service; a URL Information Field for storing information (e.g. numeric or alphanumeric string) representative of the Universal Resource Locator (URL) or Universal Resource Locators (URLs) at which information (or the multimedia type) can be found on the Internet relating to the corresponding product or service; a Trademark/Servicemark Information Field for storing information (e.g. text and/or alphanumeric strings) representative of each trademark used in connection with the promotion, sale, distribution and/or use of the corresponding product or service, and preferably registered with the United States Patent and Trademark Office (USPTO) or other governmental agency; a Product Description Information Field for storing information (e.g. text strings) descriptive of the corresponding product or service; an E-mail Address Information Field for storing information (e.g. numeric or alphanumeric string) representative of the e-mail address of the corresponding company on the Internet; and a Status Information Field for storing information (e.g. numeric or alphanumeric string) representative of whether the company associated registered product or service has paid their monthly, quarterly or annual registration fees associated with registration within the IPSD Servers of the information finding system hereof. In general, the URL stored in the URL Information Field specifies the address of an information resource on the Internet (Web), and thus may point to any one of the following types of information resources: a HTML document or file on the World Wide Web (expressed in the HyperText Markup Language); a single record in a database; the front-end of an Internet program such as Gopher; or the results of a query made using another program. In accordance with convention, the syntactic structure of each URL generally comprises: a Protocol Specifier, such as "http", "ftp", "gopher", "news", or "mailto", and specifies the type of resource that the URL is pointing (i.e. connecting) to; a Host Indicator, represented by double slashes "//" if the URL is requesting information from a Web Server; Server Name comprising a Internet Domain Name (e.g. "www."), the address of the Web Server (e.g. "ibm."), and a designator (e.g. "com", "edu", "int", "mil", "net", "org", etc.) identifying who owns the server or where it is located; a Path Name, such as "Products/Computers/", indicating a path to the destination file on the identified Server; and a Resource Name (including file extension, e.g. ".html"), such as "aptiva.html", identifying the actual named file that contains actual information resource specified by the URL.

As used herein as well as in the claims, the term "registered" shall be understood to mean listed or having an entry within the IPSI Registrant Database. Such listing or entry can be achieved in a variety of ways including, but not limited to:

(i) by specific request of the associated company or business; or (ii) by the system administrator without a request and/or authorization of the corresponding company or business linked to the product or service.

Notably, each information item contained within the information field shown along the same horizontal line of FIG. 2A is symbolically related or linked. Different products and/or services of the same registrant or related registrant may also be linked together so that a user looking for information about a particular product or service is automatically provided with URLs which are assigned to related products of the registrant which may satisfy the goals or objectives of a particular advertising and/or marketing campaign or product/service promotion program of the registrant company. As it may be desired to relate particular products and services at particular points in time, the relationships therebetween can be dynamically changed within the IPSI Registrant Database by a straightforward database updating operation carried out by a system administrator (or manager) who, in theory, can be located virtually anywhere throughout the world. Expectedly, such database updating operations would be carried out using appropriate system access and security procedures well known in the art.

Inasmuch as the UPC data structure is presently employed as a universal product identifier (i.e. a primary data structure) in a majority of industries throughout the world, its twelve (12) digit numeric string will be a preferred UPN (in many embodiments) for purposes of carrying out the principles of the present invention. This 12 digit human-readable number, printed on the bottom of each UPC symbol (and encoded within the bars and spaces of the UPC symbol itself), comprises: a six digit manufacturer number assigned to the manufacturer by the Uniform Code Council (UCC); a five digit product number assigned to the product by the manufacturer; and a one digit modulo check digit (mathematically calculated) and added to each UPC to check that the code has been read correctly by the bar code reader.

It is understood that, at present, few (if any) services have been currently assigned a UPC numeric string in the manner that nearly all consumer products have been assigned in the contempory period. However, the present invention contemplates the need for and utility of widespread assignment of UPC (or similar) numeric data structures to particular services (as well as the imprinting of the UPC (or similar) symbol on service brochures and advertisements) in order that (i) such services can be procured on the Internet through an electronic data transaction, and (ii) service-related information can be easily found (i.e. located) and accessed on websites using the system and method of the present invention.

As shown in FIG. 2B, the relational-type Non-IPSI Registrant Database maintained by each IPSD Server comprises a plurality of labelled information fields for each product or service that is not currently registered with the IPSD Server, namely: an IPSN (i.e. IP/SN) information Field for storing information (e.g. numeric or alphanumeric string) representative of the Universal Product or Service Number (e.g. UPC numeric string) assigned to the non-registered product or service; a Company Name Information Field for storing information (e.g. numeric or alphanumeric string) representative of the name of the company making, selling or distributing the corresponding non-registered product or service; a Trademark/Servicemark Information Field for storing information (e.g. text and/or alphanumeric strings) representative of each trademark (or servicemark) used in connection the promotion, sale, distribution and/or use of the corresponding product or service, and preferably registered with the USPTO or other governmental agency; a Product Description Information Field for storing information (e.g. text strings) descriptive of the corresponding product or service; and an E-mail Address Information Field for storing information (e.g. numeric or alphanumeric string) representative of the e-mail address of the corresponding company on the Internet; a Status Information Field for storing information (e.g. numeric or alphanumeric string) representative of whether the company associated non-registered product or service has been solicited by the IPSD Server, and on what dates registration solicitation has occurred. Notably, each information item contained within the information field shown along the same horizontal line of FIG. 2A is related or linked. The information required to construct the Non-IPSI Registrant Database shown in FIG. 2B can be readily obtained from a number of commercially or publicly available information sources (e.g., the Universal Code Council, Dayton, Ohio; Infotest International, http://www.infotest.com//, etc.)

Figure 3A:
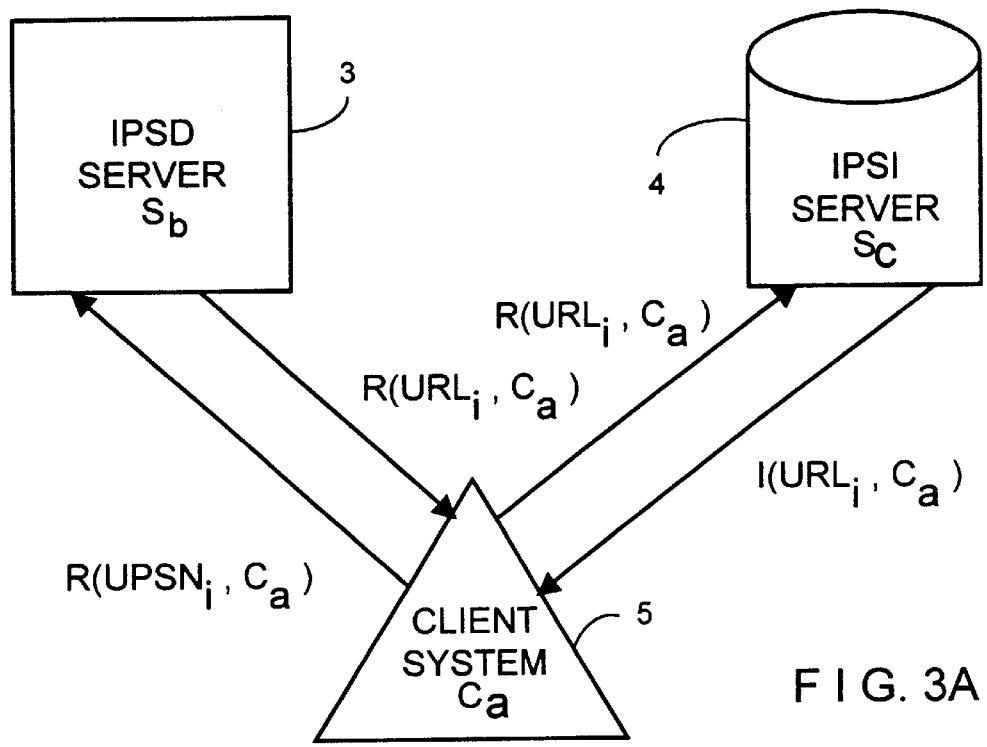
FIG. 3A is a schematic diagram illustrating the high level structure of a first type of comunication protocol that can be used among the Client System $C_a$, the IPSD Server $S_b$, and the IPSI Server $S_c$ of the IPSI finding system hereof when the GUI browser program running on the Client System is in its IPSI Finder Mode of operation, requesting as input a UPSN (i.e. UPN or USN data structure) to determine the URL(s) of the corresponding product (or service) registered therewith.
Figure 3B:
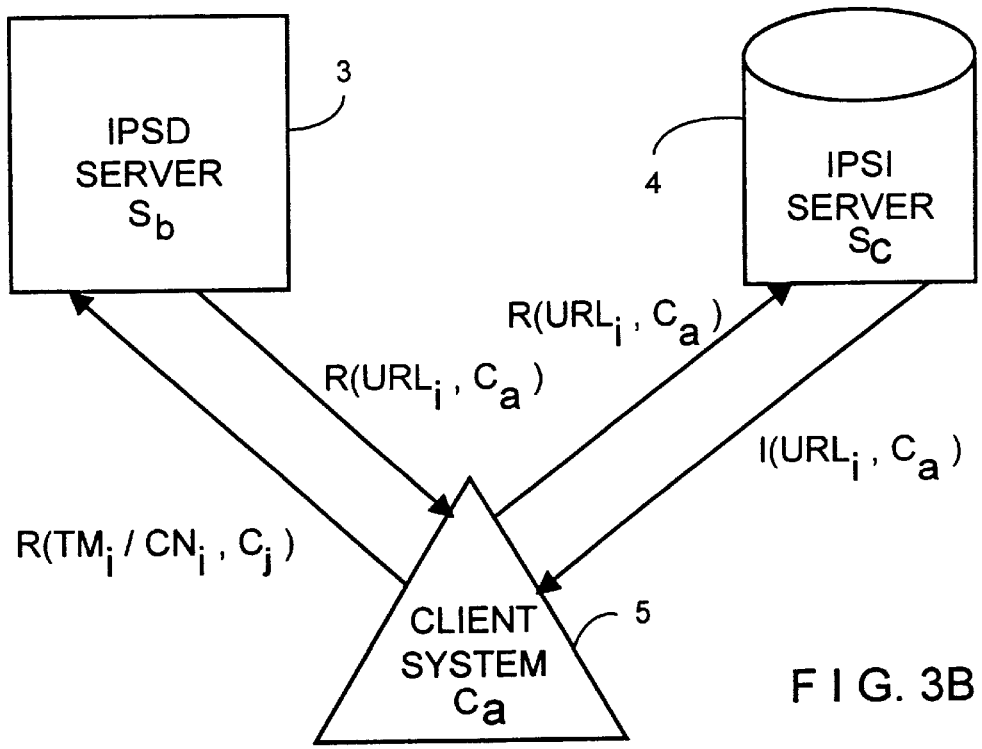
FIG. 3B is a schematic diagram illustrating the high level structure of a first type of comunication protocol that can be used among the Client System $C_a$, the IPSD Server $S_b$, and the IPSI Server $S_c$ of the IPSI finding system hereof when the GUI browser prgram on the Client System is in its UPSN Search Mode of operation, requesting as input a trademark (or servicemark) and/or company name in order to determine the UPSN (i.e. UPN or USN data structure) of the corresponding product (or service) and thus the URL(s) registered therewith.
Figure 4A:
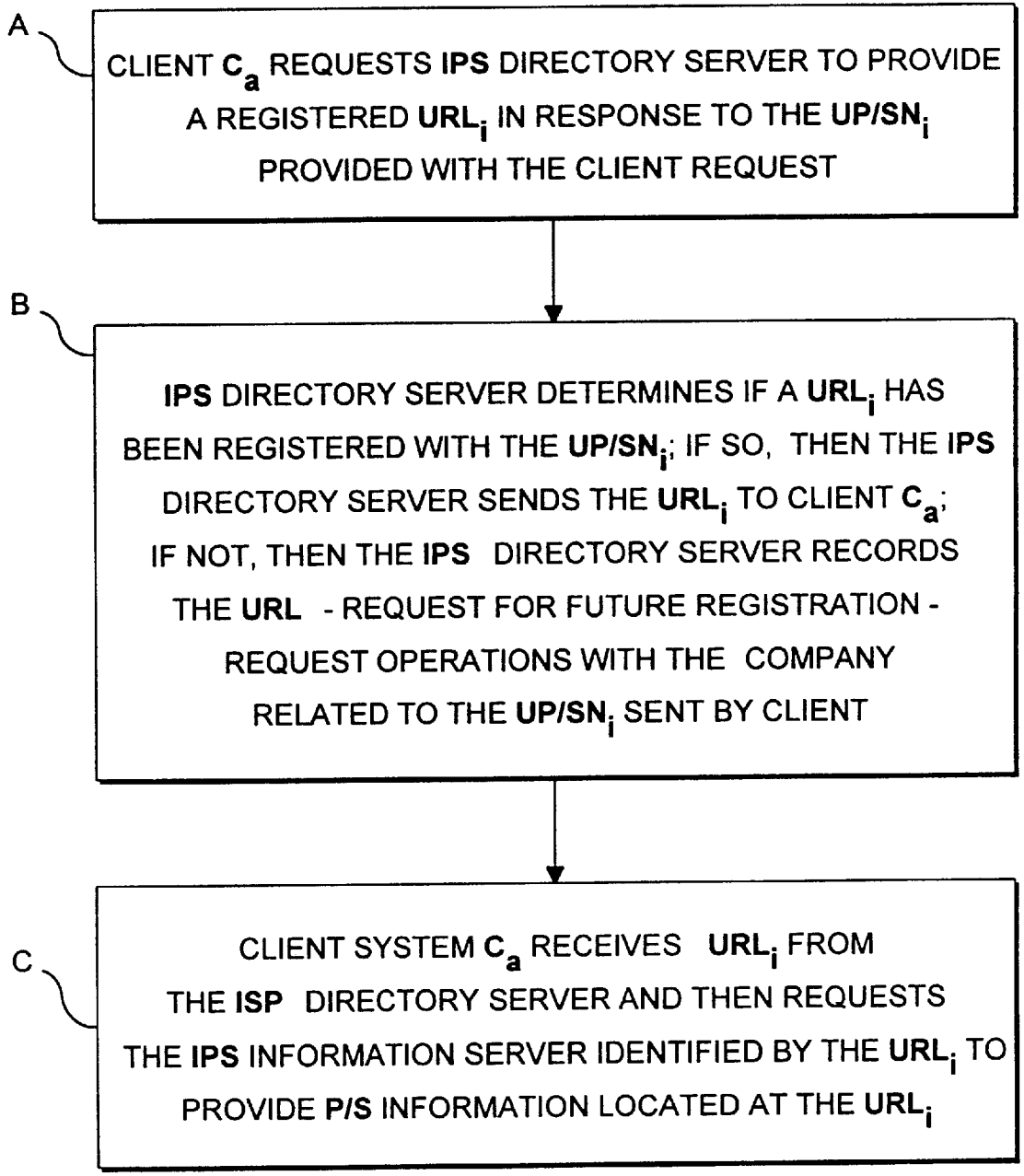
FIG. 4A is a high level flow chart illustrating the steps involved in carrying out the communication protocol shown in FIG. 3A when the Client System is in its IPSI Finder Mode of operation.
Figure 4B:
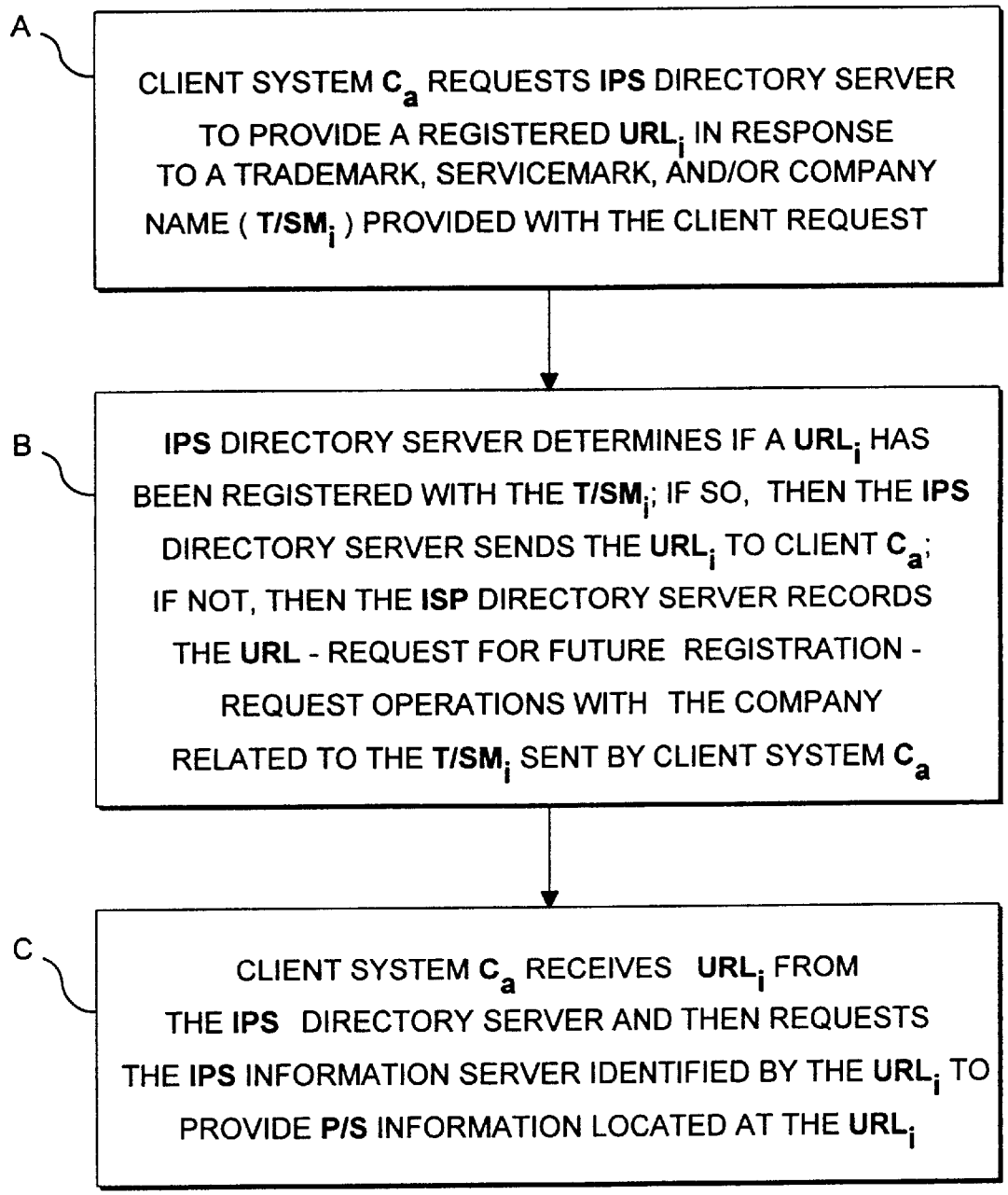
FIG. 4B is a high level flow chart illustrating the steps involved in carrying out the communication protocol shown in FIG. 3A when the Client System is in its UPSN Search mode of operation.
Figure 5A:
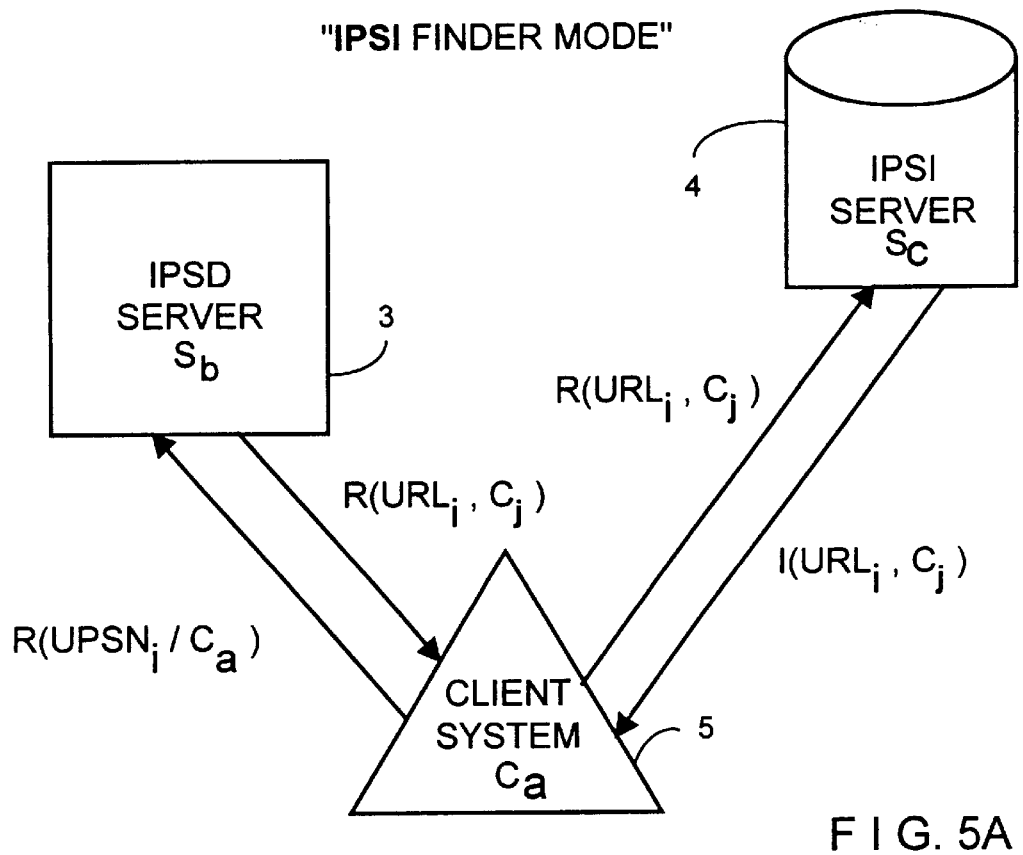
FIG. 5A is a schematic diagram illustrating the high level structure of a second type of communication protocol that can be used among the Client System $C_a$, the IPSD Server $S_b$, and the IPSI Server $S_c$ of the IPSI finding system hereof when the GUI browser program on the Client System is in its IPSI Finder Mode of operation, requiring as input a UPSN to determine the URL(s) of the corresponding product (or service) registered therewith.
Figure 5B:
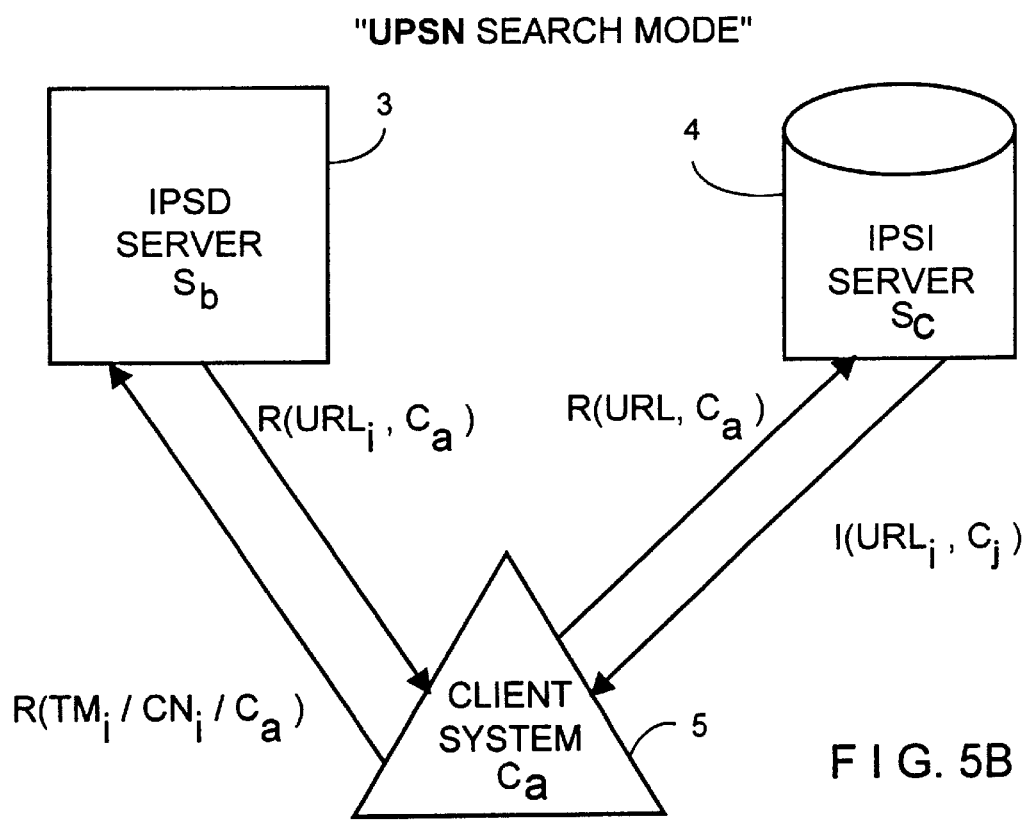
FIG. 5B is a schematic diagram illustrating the high level structure of a second type of communication protocol that can be used among the Client System $C_a$, the IPSD Server $S_b$, and the IPSI Server $S_c$ of the IPSI finding system hereof when the GUI browser program on the Client System is in its UPSN Search Mode of operation, requiring as input a trademark (or servicemark) and/or company name in order to determine the UPSN of the corresponding product (or service) and thus the URL(s) registered therewith.
Figure 6A:
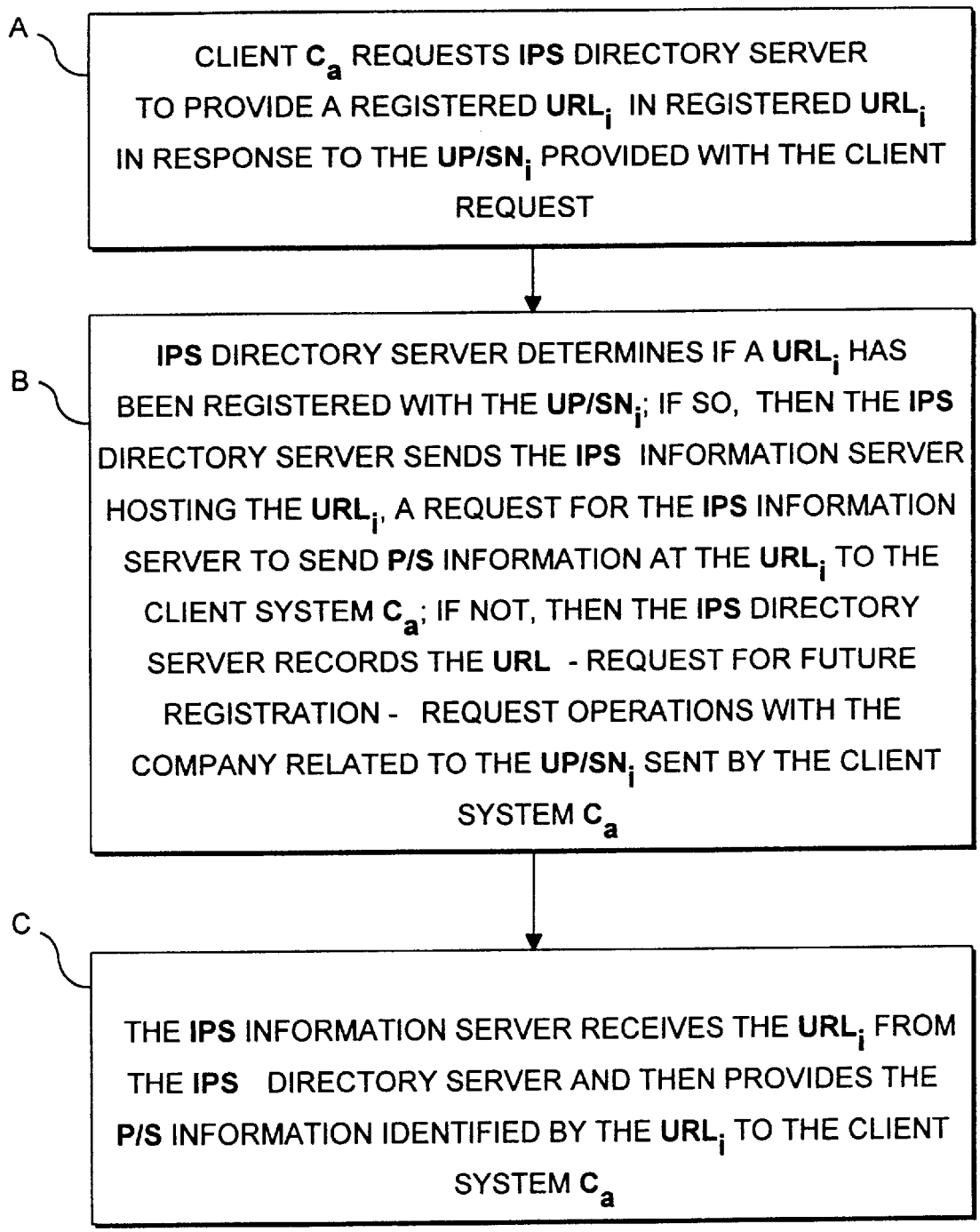
FIG. 6A is a high level flow chart illustrating the steps involved in carrying out the communication protocol shown in FIG. 5A when the Client System is in its IPSI Finder Mode of operation.
Figure 6B:
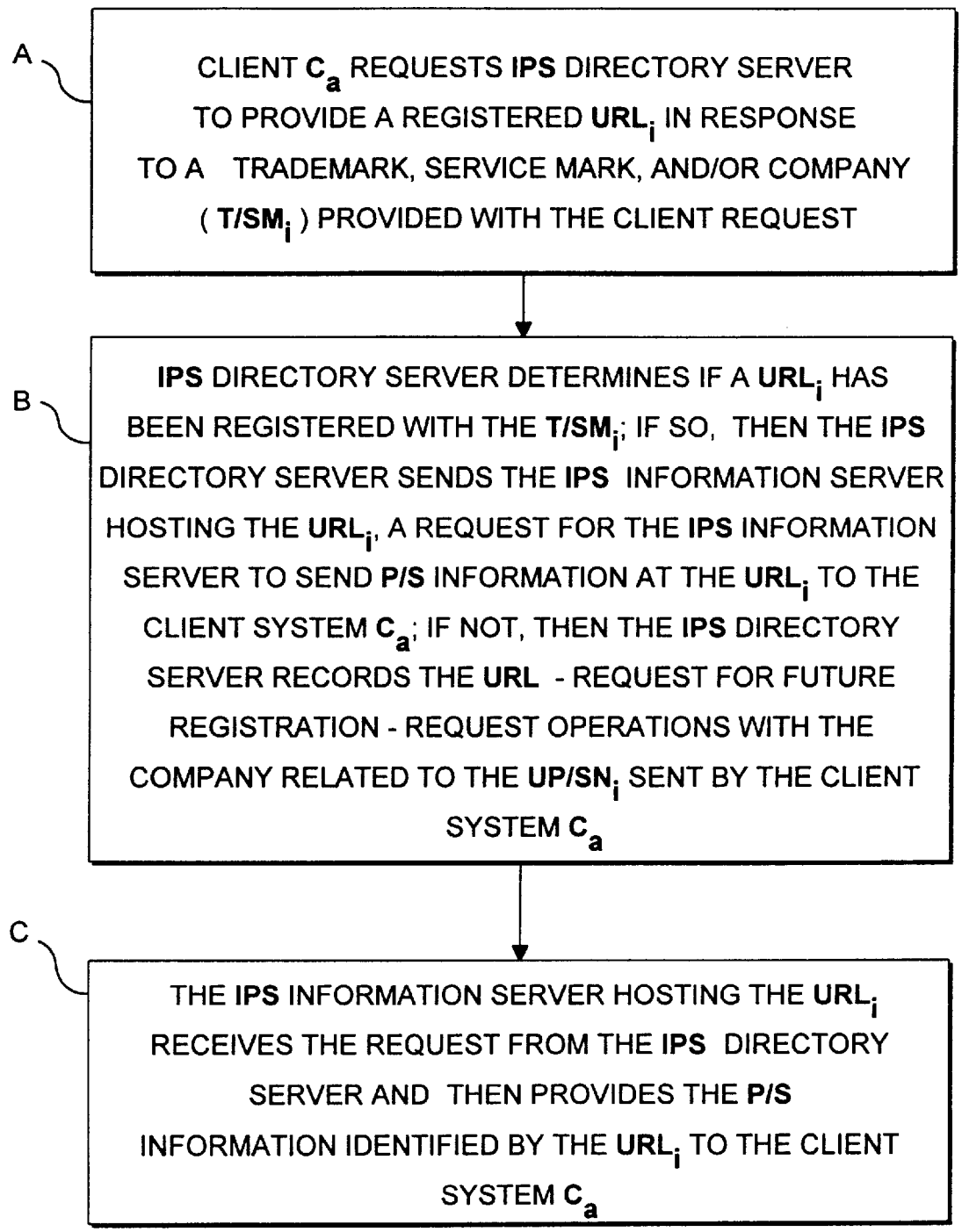
FIG. 6B is a high level flow chart illustrating the steps involved in carrying out the communication protocol shown in FIG. 5A when the Client System is in its UPSN Search mode of operation.

Communication Protocols for Carrying Out the System and Method of the Present Invention In general, there are a number of possible communication protocols that can be used to carry out the system and method of the present invention. In FIGS. 3A and 3B, a first communication protocol is schematically depicted for both the IPSI Finder and UPSN Search Modes of operation, whereas the basic operations carried out thereby are shown in FIGS. 4A and 4B. In FIGS. 5A and 5B, a second communication protocol is schematically depicted for both the IPSI Finder and UPSN Search Modes of operation, whereas the basic operations carried out thereby are shown in FIGS. 6A and 6B. The details of such protocols will be described below.

Referring to FIG. 3A, the high level structure is shown for a first-type of communication protocol that can be used among the Client System $C_a$, the IPSD Server $S_b$, and the IPSI Server $S_c$ of the IPSI finding system hereof when the GUI browser program on the Client System is in its IPSI Finder Mode of operation. FIG. 4A provides a high level flow chart illustrating the steps involved in carrying out this communication protocol when the Client System is in its IPSI Finder Mode of operation.

In order to enter the IPSI Finder mode of the system, the user pushes the "IPSI Finder" button on the GUI-based browser screen. Then at Block A of FIG. 4A, a UPSN is provided as input to IPSD Server $S_b$, and in response thereto the Client System $C_a$ requests the IPSD Server $S_b$ to provide a registered $URL_i$ if anyone exists in the IPSI Registrant Database.

At Block B in FIG. 4A, the IPSD Server $S_b$ analyses the IPSI Registrant Database shown in FIG. 2A to determine whether or not a symbolically linked $URL_i$ has been registered with a $UPSN_i$ that has been provided as input. If so, then the IPSD Server sends the symbolically linked $URL_i$ to the Client System $C_a$. If not, then the IPSD records such status registration information in the Non-IPSI Registrant Database shown in FIG. 2B.

At Block C in FIG. 4A, the Client System $C_a$ receives the $URL_i$ from the IPS D Server and then requests the IPSI Server, identified by the $URL_i$, to provide the product or service information located by the registered $URL_i$. Having accessed and displayed such product or service related information at the Client System, the user can review the information at the specified $URL_i$, acquiring knowledge about the product or service, and may, if the option is provided at the URL-specified website, purchase the product or procure (i.e. contract for) the service by way of an on-screen electronic commercial transaction. Such commercial transaction can involve product ordering, delivery specification, and financing through the use of credit or debit card transactions, COD arrangements, or any other financial arrangement acceptable to the vendor of the product or service.

Referring to FIG. 3B, the high level structure is shown for the first-type of communication protocol that can be used among the Client System $C_a$, the IPSD Server $S_b$, and the IPSI Server $S_c$ of the IPSI finding system hereof when the GUI browser program on the Client System is in its UPSN Search Mode of operation. FIG. 4B provides a high level flow chart illustrating the steps involved in carrying out this communication protocol when the Client System is in its UPSN Search Mode of operation.

In order to enter the UPSN Search Mode of the system, the user pushes the "UPSN Search" button on the GUI-based browser screen. Then at Block A of FIG. 4B, a trademark $TM_i$ (or servicemark $SM_i$) and/or a company name $CN_i$ is provided as input to IPSD Server $S_b$ by way of the browser screen, and in response thereto the Client System $C_a$ requests the IPSD Server $S_b$ to provide a registered $UPSN_i$ if any exists in the IPSI Registrant Database, and if so, then also its $URL_i$ to the Client System.

At Block B in FIG. 4A, the IPSD Server $S_b$ analyses the IPSI Registrant Database shown in FIG. 2A to determines whether or not a symbolically linked $UPSN_i$ has been registered with a $TM_i$ (or $SM_i$) and/or a company name $CN_i$ that has been provided as input to the IPSD Server $S_b$ by way of the browser screen. If so, then the IPSD Server sends to the Client System $C_a$, the $URL_i$ that is symbolically linked to the registered $UPSN_i$. If not, then the IPSD records in the URL-request in the Non-IPSI Registrant Database shown in FIG. 2B for future registration-request operations related to the $T/SM_i$ are sent by the Client System.

At Block C in FIG. 4B, the Client System $C_a$ receives the $URL_i$ from the IPSD Server and then requests the IPSI Server, identified by the $URL_i$, to provide the product or service information. Having accessed and displayed such product or service related information at the Client System, the user can review the information at the specified $URL_i$, acquiring knowledge about the product or service, and may, if the option is provided at the URL-specified website, purchase the product or procure (i.e. contract for) the service by way of an on-screen electronic commercial transaction, as described hereinabove.

Referring to FIG. 5A, the high level structure is shown for a second, alternative type of communication protocol that can be used among the Client System $C_a$, the IPSD Server $S_b$, and the IPSI Server $S_c$ of the IPSI finding system hereof when the GUI browser program on the Client System is in its IPSI Finder Mode of operation. FIG. 6A provides a high level flow chart illustrating the steps involved in carrying out this communication protocol when the Client System is in its IPSI Finder Mode of operation.

In order to enter the IPSI Finder mode of the system, the user pushes the "IPSI Finder" button on the GUI-based browser screen. Then at Block A of FIG. 5A, a UP/SN is provided as input to IPSD Server $S_b$, and, in response thereto, the Client System $C_a$ requests the IPSD Server $S_b$ to provide a registered $URL_i$ if one exists in the IPSI Registrant Database.

At Block B in FIG. 4A, the IPSD Server $S_b$ analyses the IPSI Registrant Database shown in FIG. 2A to determine whether or not a symbolically linked $URL_i$ has been registered with $UP/SN_i$ that has been provided as input. If so, then the IPSD Server sends to the IPSI Server $S_b$ hosting the URL, a request for the IPSI Server $S_c$ to send product or service information at the $URL_i$ to the requesting Client System $C_a$. If the IPSD Server $S_b$ determines that there does not exist a $URL_i$ in the IPSI Registrant Database symbolically linked with the $UP/SN_i$ provided as input to the Client System $C_a$, then the IPSD Server $S_b$ records the URL-request in the Non-IPSI Registrant Database for future registration operations with the company related to the input $UP/SN_i$.

At Block C in FIG. 4A, the IPSI Server $S_c$ receives the $URL_i$ sent from the IPSD Server $S_b$ and then provides to the Client System $C_a$, the product or service information located by the registered $URL_i$. Having accessed and displayed such product or service related information at the Client System, the user can review the information at the specified $URL_i$, acquiring knowledge about the product or service, and may, if the option is provided at the URL-specified website, purchase the product or procure (i.e. contract for) the service by way of an on-screen electronic commercial transaction.

Referring to FIG. 5B, the high level structure is shown for the second-type of communication protocol that can be used among the Client System $C_a$, the IPSD Server $S_b$, and the IPSI Server $S_c$ of the IPSI finding system hereof when the GUI browser program on the Client System is in its UP/SN Search Mode of operation. FIG. 6B provides a high level flow chart illustrating the steps involved in carrying out this communication protocol when the Client System is in its UP/SN Search Mode of operation.

In order to enter the UP/SN Search Mode of the system, the user pushes the "UP/SN Search" button on the GUI-based browser screen. Then at Block A of FIG. 5B, a trademark $TM_i$ (or servicemark $SM_i$) and/or a company name $CN_i$ is provided as input to IPSD Server $S_b$ by way of the browser screen. In response thereto, the Client System $C_a$ requests the IPSD Server $S_b$ to determine whether or not a registered $UP/SN_i$ (and thus symbolically linked $URL_j$) exists in the IPSI Registrant Database. If so, then the IPSD Server $S_b$ sends the IPSI Server $S_c$ hosting the $URL_j$, a request for the IPSI Server $S_c$ to send product or service information at the $URL_j$ to the requesting Client System $C_a$. If the IPSD Server $S_b$ determines that there does not exist a registered $UP/SN_i$ (and thus no symbolically linked $URL_j$) in the IPSI Registrant Database, then the IPSD Server records the URL request in the Non-IPSI Registrant Database for future registration operations with the company related by the $UP/SN_i$ sent by the Client System $C_a$.

At Block C in FIG. 6B, the IPSI Server hosting the $URL_i$ receives the request from the IPSD Server $S_b$ and then provides the product or service information identified by the registered $URL_i$. Having accessed and displayed such product or service related information at the Client System, the user can review the information at the specified $URL_j$, acquiring knowledge about the product or service, and may, if the option is provided at the URL-specified website, purchase the product or procure (i.e. contract for) the service by way of an on-screen electronic commercial transaction.

The communication protocols described above can be realized using any suitable programming language including, for example, an object-oriented programming language such as the Java™ programming language.

Registration of Products and Services with the IPSI System

The power of the product and service finding tool of the present invention depends in large part of the number of products and services registered with the IPSI system. In principle, numerous techniques may be employed separately and in combination with each other in order to construct the IPSI and Non-IPSI Registrant Databases supported by the IPSD Servers of the present invention.

According to a first database construction technique, product registration requests are sent out to each and every company having been issued UPC data structures for the various products which they sell, in order to ascertain the various information elements identified in the IPSI Registrant Database of FIG. 2A and construct the same.

According to a second database construction technique, a global advertising campaign is launched in order to solicit the various information elements identified in the IPSI Registrant Database of FIG. 2A and thus register the products (and services) of companies and businesses participating in the program. Preferably, such information is collected by way of e-mail to facilitate database construction operations.

According to a third database construction technique, the IPSI system itself can continuously solicit product registrations over time in order to collect information from companies responding favorably to the solicitations.

According to a fourth database construction technique, the IPSI system engages a number of commercial Internet search engines, such as Altavista™, Yahoo™, WebCrawler™, and powerful off-line parallel computing machines that analyze (i.e. mine) information on the World Wide Web in order to collect and link the information elements specified in the IPSI Registrant Database of FIG. 2A.

Once an "initial" IPSI Registrant Database has been constructed, and is thereafter updated and expanded over time, companies registered therewith can be periodically contacted in order to ensure the accuracy of the information contained within the database of the IPSI system.

Operation of the IPSI Finding System and Method

Figure 1A:
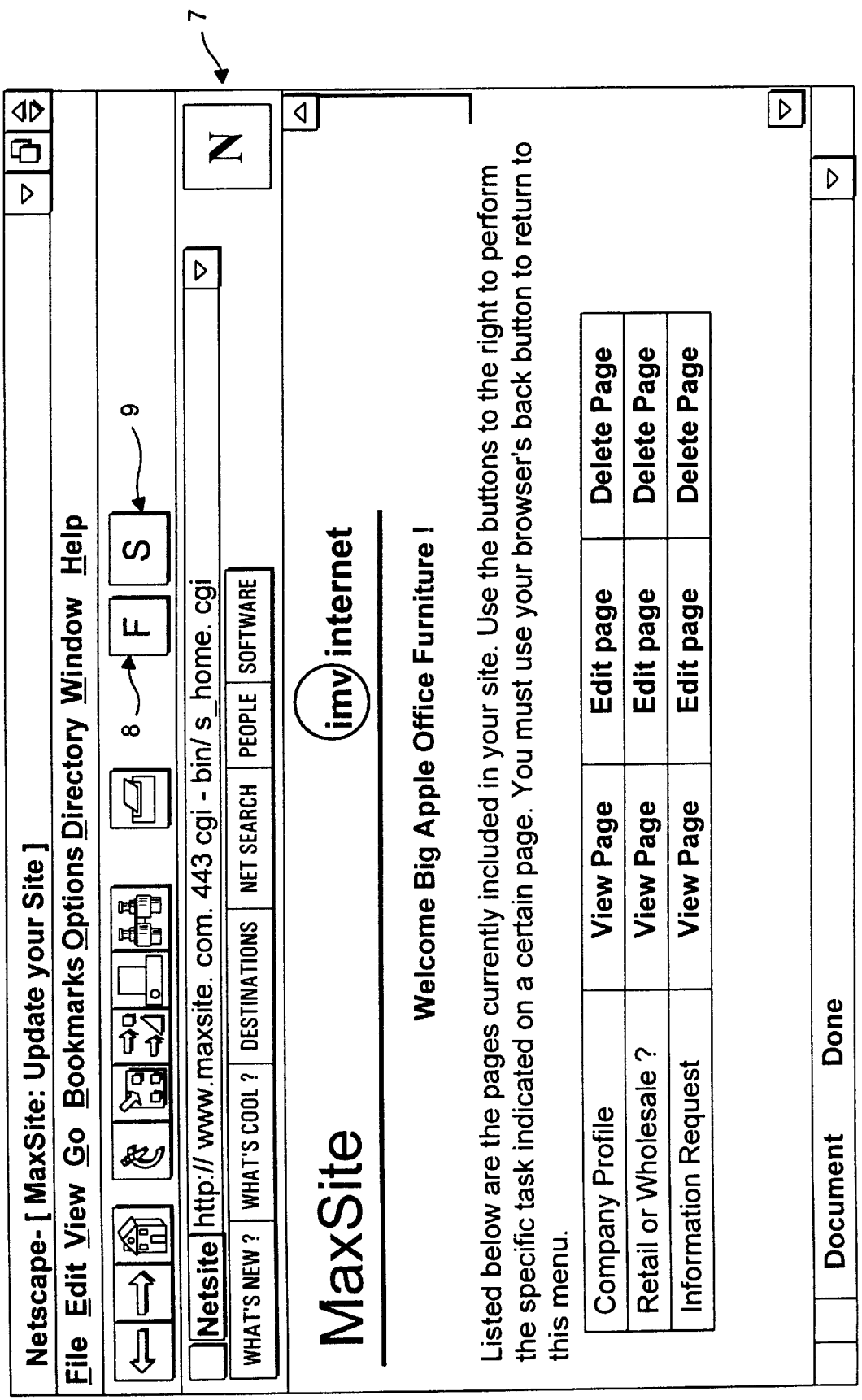
FIG. 1A is a schematic representation of an exemplary display screen produced by a graphical user interface (GUI) based web browser program running on a Client System and providing an on-screen IPSI Finder button and an on-screen US/PN Search button for carrying out the IPSI finding method of the present invention.
Figure 1B:
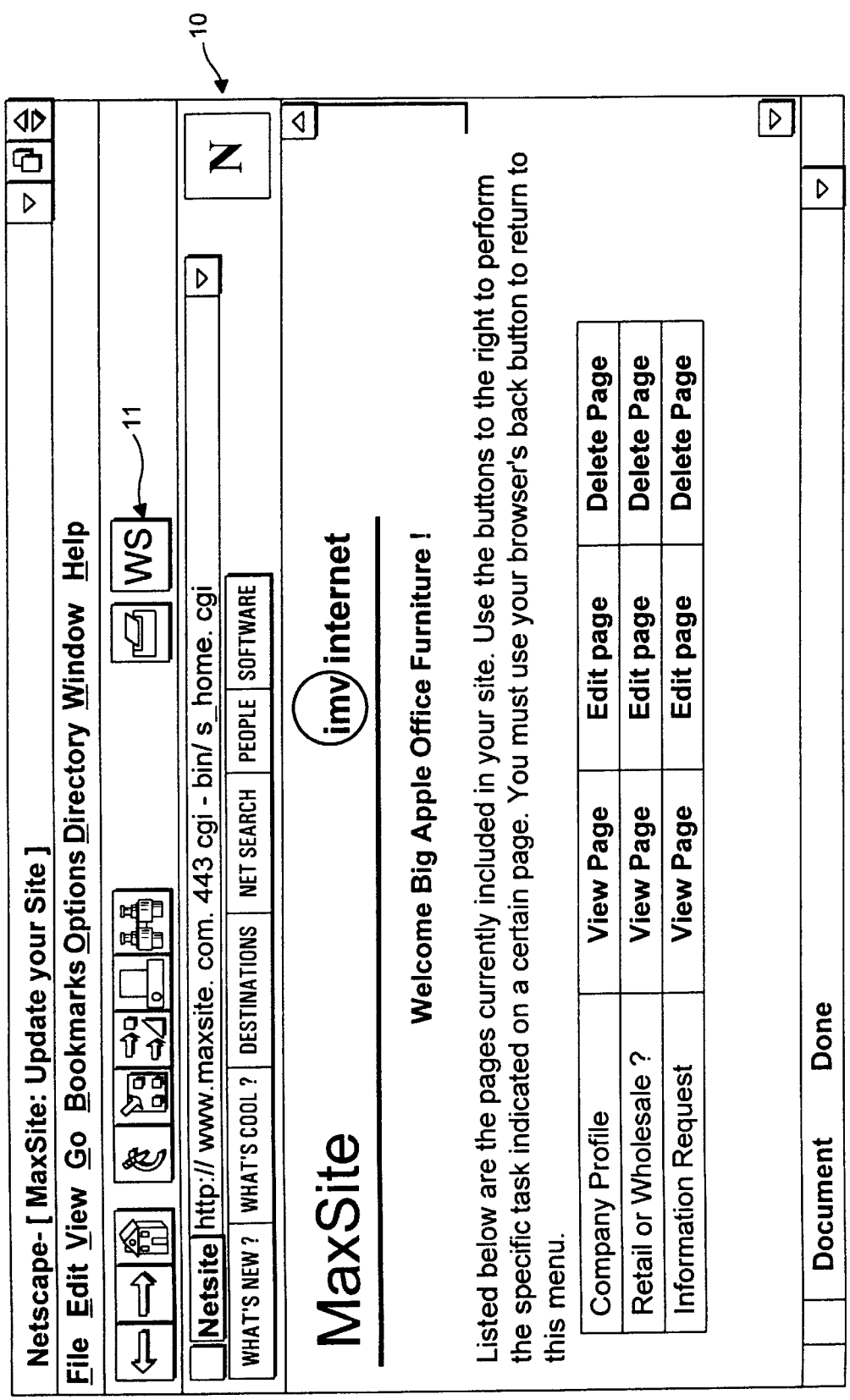
FIG. 1B is a schematic representation of an exemplary display screen produced by a GUI-based web browser program running on a Client System and providing an on-screen IPSD Website Finder button for instantly connecting to the IPSD Website and carrying out the Internet Product and Service Information finding method of the present invention.

In each of the above-described embodiments of the system hereof shown in FIGS. 1A and 1B, the Internet browser interface of each Client System is provided with two independent modes of operation, namely: the "ISPI Finder Mode" and the "UPSN Search Mode".

When the "IPSI Finder" button is depressed, the system enters its the IPSI Finder Mode. Preferably, the user is provided with a choice of language (e.g. English, German, French, Japanese, Chinese, etc.) by way of an appropriate menu-selection screen. When the system is in this operational mode, as illustrated in FIGS. 3A, 4A and 5A, 6A, a web-based information resource pertaining to any commercial product or service registered with the system can be automatically accessed from the Internet and displayed from the Internet browser of a Client System. Such information resources can include advertisements, specifications, operation descriptions, product simulations, purchase information, maintenance information, warranty information, electronic data transaction screens, etc. In this mode, desired product or service information is obtained by simply manually entering the registered product's UPN (e.g. its UPC's 12 digit numerical string) or the registered service's USN (e.g. its UPC's 12 digit numerical string) into the dialogue box of the Internet browser or Internet application tool. Alternatively, a bar code symbol scanner can be used to enter the UP/SN (e.g. UPC or USC numeric string) into the system, thereby avoiding manual keyboard entry operations. The output of the system is the audio and visual display of the website of the registered product or service.

When the "UP/SN Search" button is depressed, the system enters its UP/SN Search Mode". Preferably, the user is provided with a choice of language (e.g. English, German, French, Japanese, Chinese, etc.) by way of an appropriate menu-selection screen. When the system is in this operational mode, as illustrated in FIGS. 3B, 4B and 5B, 6B, a predesignated information resource pertaining to any commercial product or service registered with the system can be automatically accessed from the Internet and displayed from the Internet browser of a Client System. Such information resources can include advertisements, specifications, operation descriptions, product simulations, product upgrade information, purchase information, maintenance information, warranty information, etc. In this mode, desired product or service information is obtained by simply entering the registered product's trademark(s) or servicemark(s) and/or associated company name into the dialogue box of the Internet browser or Internet application tool. The output of the system is the audio and visual display of the website of the registered product or service.

The Automated Registration Solicitation Mode of the System

In the illustrative embodiments of the present invention, data-synchronized IPSD Servers are also provided with an "Automated Registration Solicitation Mode" programmed by the webmaster (or administrator) of the IPSI Website. In this mode, each IPSD Server analyzes the data collected within its Non-IPSI Registrant Database. The data analysis procedure seeks to determine: (1) which "unregistered" products or services in the Non-IPSI Registrant Database were the subject of an information request at the IPSD Server; (2) how many hits (requests) were made for the product or service within a predetermined length of time (e.g. one week) by Internet users; and (3) whether the number of requests exceeds a particular "request threshold" (e.g. 100 requests in week period). Then for each unregistered product (or service) which has exceeded the request threshold, the IPSD Server automatically sends an E-mail message to the associated company. Preferably, the E-mail message is designed to (i) inform the company of recent information requests for their products and/or services, and (ii) solicit the registration of such products and/or services with the IPSD Server. Once registered with the system, such products and services can be easily found on the Internet by anyone wishing to use the product and service finding techniques of the present invention.

The present invention has been described in great detail with reference to the above illustrative embodiments. It is understood, however, that numerous modifications will readily occur to those with ordinary skill in the art having had the benefit of reading the present disclosure.

For example, in the illustrative embodiments described hereinabove, separate databases are maintained by each data-synchronized IPSD Server for (i) registered products and services within the system, and (ii) non-registered products and services within the system. Notably, the reasons for using a dual database design of this sort would be based largely on economics, namely: only those companies who have paid the required maintenance (or registration) fees get their products (or services) and linked URLs "registered" with the system, whereas non-paying companies do not get their products (or services) and linked URLs registered with the system, regardless of how such product-URL or service-URL information is ascertained (e.g. by solicitation versus data mining).

Thus it is contemplated that in some embodiments of the present invention, each IPSD Server will be designed to maintain only a single database for maintaining product-URL and service-URL information currently available on the Internet. In such embodiments of the present invention, the concept of "non-registered" products and services will be altogether avoided, since the system implementation and administration will (in all likelihood) be designed to not require companies to pay maintenance (or registration) fees in order that their products (or services) and linked URLs are registered with the IPSI system. Instead, some alternative income producing scheme will be used in such embodiments of the present invention (e.g. user fees, subscription fees, Internet browser-licensing fees, etc.) for system maintenance and administration.

These and all other such modifications and variations are deemed to be within the scope and spirit of the present invention as defined by the accompanying Claims to Invention.

What is claimed is:

1. A system of finding information pertaining to a particular product on the Internet, comprising:
    a database server connected to the Internet and including
        URL/UPN information storage means for storing information representative of (i) a plurality of universal product numbers (UPNs) assigned to a plurality of products, and (ii) a plurality of URLs symbolically linked to said plurality of UPNs, each said URL specifying the location of an information resource located on the Internet related to a particular one of said products, and
        request servicing means for servicing a request made by a client system, for information about one of said plurality of products located on the Internet, wherein said request is transmitted to said Internet database server and includes information representative of the UPN assigned to said product; and
    a plurality of product-information servers, each connected to the Internet and including
        product-related information storage means for storing information related to said plurality of products, and
        information delivery means, responsive to said request servicing means, for delivering to said client system, information related to one of said plurality of products specified by the URL symbolically linked to the UPN included in said request made by said client system.

2. The system of claim 1, wherein said UPN assigned to each said product is a unique Uniform Product Code (UPC) number assigned to said product.

3. The system of claim 2, wherein each said UPC number is encoded within the structure of a bar code symbol, and said client system further comprises a bar code reader for reading said bar code symbol and providing the UPC number encoded therein to said client system.

4. The system of claim 1, which further comprises said client system, wherein said client system includes a Internet browser program having an on-screen product finder button which, when depressed, results in a dialogue box requesting that the UPN associated with said request be entered into said client system.

5. The system of claim 1, wherein said product related information is of a multi-media nature.

6. A method of finding information pertaining to a particular product on the Internet, comprising the steps of:
    (a) storing in a database server connected to the Internet, information representative of (i) a plurality of universal product numbers (UPNs) assigned to a plurality of products, and (ii) a plurality of URLs symbolically linked to said plurality of UPNs, each said URL specifying the location of an information resource located on the Internet related to a particular one of said products;
    (b) storing in a plurality of product-information servers, information related to said plurality of products;
    (c) transmitting to said database server from a client system, a request for information about one of said plurality of products located on the Internet, wherein said request includes information representative of the UPN assigned to said product; and
    (d) at least one said product information server responding to said request transmitted to said database server, and delivering to said client system, information related to one of said plurality of products specified by the URL symbolically linked to the UPN and included in said request made by said client system.

7. The method of claim 6, wherein said UPN assigned to each said product is a unique Uniform Product Code (UPC) number assigned to said product.

8. The method of claim 7, wherein each said UPC number is encoded within the structure of a bar code symbol placed on one of said plurality of products, and wherein said step (c) further comprises
    reading the bar code symbol on at least one of said plurality of products, and providing the UPC number encoded therein to said client system.

9. The method of claim 6, wherein step (c) comprises:
    depressing an on-screen product finder button displayed by an Internet browser program running on said client system, whereupon a dialogue box is displayed requesting that the UPN associated with the requested product be entered; and entering said UPN into said dialogue box.

10. A database server connected to the Internet comprising:

URL/UPN information storage means for storing information representative of (i) a plurality of universal product numbers (UPNs) assigned to a plurality of products, and (ii) a plurality of URLs symbolically linked to said plurality of UPNs, each said URL specifying the location of an information resource located on the Internet related to a particular one of said products, and request servicing means for servicing a request made by a client system, for information about one of said plurality of products located on the Internet, wherein said request is transmitted to said Internet database server and includes information representative of the UPN assigned to said product.

11. The database server of claim 10, wherein said UPN assigned to each said product is a unique Uniform Product Code (UPC) number assigned to said product.

12. The database server of claim 11, in combination with said client system, wherein each said UPC number is encoded within the structure of a bar code symbol placed on one of said plurality of products, and said client system further comprises a bar code reader for reading said bar code symbol and providing the UPC number encoded therein to said client system.

13. The database server of claim 10, wherein said product related information is of a multi-media nature.

* * * * *